US012725068B2

(12) United States Patent
Mentovich et al.

(10) Patent No.: US 12,725,068 B2
(45) Date of Patent: Sep. 1, 2026

(54) QUANTUM DEVICES AND MEMORY STRUCTURES FOR QUANTUM METROLOGY

(71) Applicant: Mellanox Technologies, Ltd., Yokneam (IL)

(72) Inventors: Elad Mentovich, Tel Aviv (IL); Itshak Kalifa, Bat Yam (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 346 days.

(21) Appl. No.: 18/137,755

(22) Filed: Apr. 21, 2023

(65) Prior Publication Data

US 2024/0354617 A1 Oct. 24, 2024

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
None
See application file for complete search history.

(56) References Cited

U.S. PATENT DOCUMENTS 6,741,374 B2 5/2004 Pittman
7,881,473 B2 2/2011 Wang
8,369,710 B2 2/2013 Thiele
8,433,070 B2 4/2013 Habif
9,077,577 B1 7/2015 Ashrafi
9,356,780 B2 5/2016 Tanizawa
9,692,523 B2 6/2017 Smith
9,876,639 B2 1/2018 Choi
10,594,408 B2 3/2020 Bishop
(Continued)

FOREIGN PATENT DOCUMENTS

CN 108780129 A * 11/2018 ............. G01R 23/16
CN 114915417 A 8/2022
(Continued)

OTHER PUBLICATIONS

Avron, J. et al., "Quantum advantage and noise reduction in distributed quantum computing," Physical Review A., Aug. 23, 2021, 104.5: p. 052404.
(Continued)

*Primary Examiner* — Kevin R Steckbauer
(74) *Attorney, Agent, or Firm* — ALSTON & BIRD LLP

(57) ABSTRACT

Quantum systems, devices, and methods are described herein that enable quantum metrology. An example quantum device includes a first quantum measurement module operably coupled with a first quantum system. The first quantum measurement module applies one or more measurements to the first quantum system and obtains first information associated with the first quantum system based on the one or more measurements. The quantum device further includes a first quantum memory structure operably coupled with the first quantum measurement module. A coherence time window associated with the first quantum memory structure is greater than a coherence time window time associated with the first quantum system. The quantum devices and associated memory structures provide a new methodology for a quantum metrology system.

20 Claims, 6 Drawing Sheets

(56) References Cited

U.S. PATENT DOCUMENTS

| | | | | |
|---|---|---|---|---|
| 10,855,457 | B1 | 12/2020 | Vakili | |
| 10,862,677 | B2 | 12/2020 | Bitauld | |
| 11,163,535 | B1 | 11/2021 | Vakili | |
| 11,240,013 | B1 | 2/2022 | Vakili | |
| 11,309,970 | B2 | 4/2022 | Woodward | |
| 11,343,270 | B1 | 5/2022 | Carter, Jr. | |
| 11,405,115 | B2 | 8/2022 | Gimeno-Segovia | |
| 11,444,636 | B2 | 9/2022 | Lucarelli | |
| 11,451,308 | B1 | 9/2022 | Bucklew | |
| 11,483,144 | B1 | 10/2022 | Vakili | |
| 11,610,147 | B2 * | 3/2023 | Vacon | G06F 12/122 |
| 11,664,983 | B2 | 5/2023 | Mentovich | |
| 11,700,066 | B2 * | 7/2023 | Hosseini | H04B 10/70 398/140 |
| 11,748,651 | B2 * | 9/2023 | Zou | G06F 9/30196 706/45 |
| 11,829,847 | B2 * | 11/2023 | Vacon | G06F 12/0895 |
| 11,994,426 | B1 * | 5/2024 | Najafi | G01J 1/44 |
| 12,039,409 | B2 * | 7/2024 | Vacon | G06N 10/00 |
| 12,244,351 | B2 * | 3/2025 | Van Den Bossche | H04B 10/70 |
| 12,308,889 | B2 * | 5/2025 | Becker | H01P 7/00 |
| 2002/0067882 | A1 | 6/2002 | Guilfoyle | |
| 2003/0118282 | A1 | 6/2003 | Tatum | |
| 2004/0013437 | A1 | 1/2004 | Wiltsey | |
| 2004/0037496 | A1 | 2/2004 | Pierce | |
| 2004/0126072 | A1 | 7/2004 | Hoon Lee | |
| 2004/0202218 | A1 | 10/2004 | Thornton | |
| 2005/0078826 | A1 | 4/2005 | Takeuchi | |
| 2006/0013396 | A1 | 1/2006 | Kollmitzer | |
| 2006/0245762 | A1 | 11/2006 | Thiele | |
| 2008/0137858 | A1 | 6/2008 | Gelfond | |
| 2008/0165957 | A1 | 7/2008 | Kandasamy | |
| 2008/0175385 | A1 | 7/2008 | Lee | |
| 2008/0292095 | A1 | 11/2008 | Vig | |
| 2008/0292102 | A1 | 11/2008 | Wang | |
| 2009/0070402 | A1 | 3/2009 | Rose | |
| 2009/0180615 | A1 | 7/2009 | Trifonov | |
| 2011/0129225 | A1 | 6/2011 | Gostin | |
| 2011/0150502 | A1 | 6/2011 | Zhao | |
| 2012/0177201 | A1 | 7/2012 | Ayling | |
| 2013/0101119 | A1 | 4/2013 | Nordholt | |
| 2016/0218867 | A1 | 7/2016 | Nordholt | |
| 2017/0040772 | A1 | 2/2017 | Raz | |
| 2017/0214525 | A1 | 7/2017 | Zhao | |
| 2017/0344898 | A1 | 11/2017 | Karimi | |
| 2018/0069631 | A1 | 3/2018 | Ashrafi | |
| 2018/0241553 | A1 | 8/2018 | Lucamarini et al. | |
| 2018/0365585 | A1 | 12/2018 | Smith | |
| 2019/0123847 | A1 | 4/2019 | Bush | |
| 2019/0379463 | A1 | 12/2019 | Shields | |
| 2020/0044836 | A1 | 2/2020 | Kim | |
| 2021/0083864 | A1 | 3/2021 | Bush | |
| 2021/0105135 | A1 | 4/2021 | Figueroa | |
| 2021/0152347 | A1 | 5/2021 | Cambou | |
| 2021/0174237 | A1 | 6/2021 | Mentovich | |
| 2021/0231879 | A1 | 7/2021 | Mathai | |
| 2021/0342161 | A1 | 11/2021 | Lauer | |
| 2022/0006627 | A1 | 1/2022 | Ko | |
| 2022/0114471 | A1 * | 4/2022 | Vacon | G06N 10/70 |
| 2022/0150044 | A1 | 5/2022 | Xiang et al. | |
| 2022/0209942 | A1 | 6/2022 | Mentovich | |
| 2022/0209943 | A1 | 6/2022 | Syrivelis | |
| 2022/0222567 | A1 * | 7/2022 | Reagor | G06N 10/40 |
| 2022/0224996 | A1 | 7/2022 | Nickerson | |
| 2022/0245496 | A1 | 8/2022 | Singh | |
| 2022/0269974 | A1 * | 8/2022 | Bhaskar | G02F 3/024 |
| 2022/0329417 | A1 | 10/2022 | Farinholt et al. | |
| 2023/0054881 | A1 * | 2/2023 | Ota | H10N 30/802 |
| 2023/0058994 | A1 * | 2/2023 | Vacon | G06F 12/0895 |
| 2023/0059433 | A1 | 2/2023 | Lecocq | |
| 2023/0132571 | A1 | 5/2023 | Bakopoulos | |
| 2023/0162075 | A1 * | 5/2023 | Zou | G06F 9/30196 706/45 |
| 2023/0163860 | A1 * | 5/2023 | Van Den Bossche | H04B 10/118 398/140 |
| 2023/0177375 | A1 * | 6/2023 | Vacon | G06N 10/20 711/133 |
| 2023/0236846 | A1 * | 7/2023 | Kaliteevskiy | G06N 10/00 713/100 |
| 2023/0237359 | A1 * | 7/2023 | Rogers | G06N 10/20 706/62 |
| 2023/0325702 | A1 * | 10/2023 | Mishra | G06N 10/40 716/100 |
| 2024/0171289 | A1 * | 5/2024 | Becker | G02F 1/212 |
| 2024/0346355 | A1 * | 10/2024 | Hoffman | G06N 10/40 |
| 2024/0354614 | A1 * | 10/2024 | Vacon | G06N 10/70 |
| 2024/0354617 | A1 * | 10/2024 | Mentovich | G06N 10/20 |
| 2025/0217692 | A1 * | 7/2025 | Wang | G06N 10/80 |

FOREIGN PATENT DOCUMENTS

| | | | | |
|---|---|---|---|---|
| CN | 116663668 | A * | 8/2023 | G06F 12/0875 |
| CN | 116663668 | B * | 4/2025 | G06F 12/0875 |
| JP | 7351404 | B2 * | 9/2023 | H10B 99/10 |
| KR | 102098285 | B1 | 4/2020 | |
| WO | WO-2021181444 | A1 * | 9/2021 | H10B 99/10 |
| WO | WO-2021262322 | A2 * | 12/2021 | G06F 12/0875 |
| WO | 2023003656 | A2 | 1/2023 | |
| WO | 2024156939 | A1 | 8/2024 | |

OTHER PUBLICATIONS

Beals, R. et al., “Efficient Distributed Quantum Computing,” Proceedings of the Royal Society A: Mathematical, Physical and Engineering Sciences, Nov. 19, 2012, 469, No. 2153: p. 20120686.

“Bidirectional (BiDi) WDM Transceivers,” Jun. 1, 2021 [online]. Retrieved from the internet: <https://community.fs.com/blog/a-brief-introduction-of-bidi-sfp-transceiver.html>.

Chen, W. et al., “A Novel Picoseconds Optical Pulse Source for Free-Space Decoy-State Quantum Key Distribution,” 2013 IEEE Nuclear Science Symposium and Medical Imaging Conference. pp. 1-4.

Cochran, R. et al., “Qubit-Based Clock Synchronization for QKD Systems Using a Bayesian Approach,” Entropy 2021, 23.8, p. 988. <https://doi.org/10.3390/e23080988>.

Diadamo, S. et al., “Distributed Quantum Computing and Network Control for Accelerated VQE,” Quantum Physics Systems and Control. IEEE Transactions on Quantum Engineering 2021. pp 1-21. <https://doi.org/10.1109/TQE.2021.3057908>.

Takahashi, Dean, “Twitch cofounder Justin Kan is back with NFT gaming market place Fractal,” Gamesbeat, (Dec. 2021), <https://venturebeat.com/2021/12/13/twitch-cofounder-justin-kan-is-back-with-nft-gaming-marketplace-fractal/>.

Vest, G. et al., “Design and Evaluation of a Handheld Quantum Key Distribution Sender module,” 2014, IEEE Journal of Selected topics in Quantum Electronics, vol. 21, No. 3, pp. 1-7.

Wengerowsky, S. et al. “An entanglement-based wavelength-multiplexed quantum communication network,” Nature 564, pp. 225-228, Dec. 12, 2018 [online]. Retrieved from the Internet: <https://doi.org/10.1038/s41586-018-0766-y>.

Humble, T. et al., “Quantum Computers for High-Performance Computing,” IEEE Micro, 41.5 (2021): pp. 15-23.

Jiang, N. et al., “Secure key distribution applications of chaotic lasers,” 2016, Proc. of SPIE vol. 10026, pp. 1-8.

Kass, Michael, LinkedIn post entitled “Plumbing the Metaverse with USD,” (Mar. 2021), <https://www.linkedin.com/pulse/plumbing-metaverse-usd-michael-kass/trackingId=y2PXzhkR76bnLEoMzY2ilw%3D%3D>.

Kim, J. et al., “Technology-Driven, Highly-Scalable Dragonfly Topology,” IEEE, 2008 International Symposium on Computer Architecture, 2008, pp. 77-88.

Lambert, R. et al., “Quantum-classical path integral. I. Classical memory and quantum nonlocality,” The Journal of Chemical Physics, vol. 137, pp. 1-10, 2012.

(56) References Cited

OTHER PUBLICATIONS

Liu, Xu et al., "An entanglement-based quantum network based on symmetric dispersive optics quantum key distribution," APL Photonics 5, 076104, Jul. 8, 2020 [online]. Retrieved from the Internet: <https://doi.org/10.1063/5.0002595>.
Mellette, W. et al., "Expanding across time to deliver bandwidth efficiency and low latency," 17th USENIX Symposium on Networked Systems Design and Implementation, Feb. 2020, 19 pages.
Navarrete, Glynis, "What is a PCIe Switch?," 2021.
Preskill, J., "Quantum Computing in the NISQ era and beyond," Institute for Quantum Information and Matter and Walter Burke Institute for Theoretical Physics, California Institute of Technology, Pasadena CA 91125, arXiv:1801.00862v3, Jul. 31, 2018, <https://doi.org/10.22331/q-2018-08-06-79>.
Zahringer, F. et al., "Realization of a Quantum Walk with One and Two Trapped Ions," Phys. Rev. Lett. 104, 100503, Mar. 9, 2010, <https://journals.aps.org/prl/abstract/10.1103/PhysRevLett.104.100503>.
Shor, P., "Algorithms for Quantum Computation: Discrete Logarithms and Factoring," Proceedings of the 35th Annual Symposium on Foundations of Computer Science, pp. 124-134, Nov. 20-22, 1994.
Singh, S. et al., "Universal quantum computing using single-particle discrete-time quantum walk," Sci Rep 11, 11551 (2021), <https://doi.org/10.1038/s41598-021-91033-5>.
Tessinari, R. et al., "Field trial of dynamic DV-QKD networking in the SDN controlled fully meshed optical metro network of the Bristol city 5GUK test network," ECOC2019, Dublin Ireland, 4 pages.
Venegas-Andraca, S.E., "Quantum walks: a comprehensive review," Quantum Inf Process 11.5, pp. 1015-1106 (2012), <https://doi.org/10.1007/s11128-012-0432-5>.
Bakopoulos, P. et al., Pending U.S. Appl. No. 17/686,475, filed Mar. 4, 2022.
Ganju, S. et al., Pending U.S. Appl. No. 18/091,214, filed Dec. 29, 2022.
Seifoory, H. et al., Pending U.S. Appl. No. 18/108,145, filed Feb. 10, 2023.
Septon, T. et al., Pending U.S. Appl. No. 18/220,990, filed Jul. 12, 2023.
Septon, T. et al., Pending U.S. Appl. No. 18/221,007, filed Jul. 12, 2023.
Septon, T. et al., Pending U.S. Appl. No. 18/123,555, filed Mar. 20, 2023.
Septon, T. et al., Pending U.S. Appl. No. 17/878,464, filed Aug. 1, 2022.
Mentovich, E. et al., Pending U.S. Appl. No. 17/828,854, filed May 31, 2022.
Ganju, S. et al., Pending U.S. Appl. No. 17/863,779, filed Jul. 13, 2022.
Scheps, K. et al., Pending U.S. Appl. No. 17/660,349, filed Apr. 22, 2022.
Vegas Olmos, J. et al., Pending U.S. Appl. No. 17/675,669, filed Feb. 18, 2022.
Seifoory, H. et al., Pending U.S. Appl. No. 18/137,737, filed Apr. 21, 2023.
Seifoory, H. et al., Pending U.S. Appl. No. 18/137,758, filed Apr. 21, 2023.
Mentovich, E. et al., Pending U.S. Appl. No. 18/135,954, filed Apr. 18, 2023.
Hu et al., A Method Using Photon Collapse and Entanglement to Transmit Information, Jun. 27, 2024, pp. 1-16, arXiv:2406.19158, https://doi.org/10.48550/arXiv.2406.19158 (Year: 2024).
Melkikh, "Quantum field theory solves the problem of the collapse of the wave function", Nov. 1, 2013, pp. 1-16, arXiv: 1311.0205, https://doi.org/10.48550/arXiv.1311.0205 (Year: 2013).

* cited by examiner

QUANTUM DEVICES AND MEMORY STRUCTURES FOR QUANTUM METROLOGY

TECHNOLOGICAL FIELD

Example embodiments of the present disclosure relate generally to quantum systems and, more particularly, to quantum devices that employ quantum memory structures.

BACKGROUND

Communication networks, computing systems, and the like are employed in a variety of applications in order to transmit data from one location to another and/or perform various operations. Quantum systems leverage the laws of quantum mechanics (e.g., superposition, entanglement, etc.) to provide the transmission of information between nodes in a network, to perform complex processes, and/or the like. Through applied effort, ingenuity, and innovation, various deficiencies and problems associated with quantum devices and systems have been solved by developing solutions that are configured in accordance with the embodiments of the present disclosure, many examples of which are described in detail herein.

BRIEF SUMMARY

Quantum systems, devices, and methods are described herein that enable quantum metrology with novel quantum memory structures and provide a new methodology for quantum metrology systems. An example quantum device may include a first quantum measurement module operably coupled with a first quantum system The first quantum measurement module may be configured to apply one or more measurements to the first quantum system and obtain first information associated with the first quantum system based on the one or more measurements. The quantum device may further include a first quantum memory structure operably coupled with the first quantum measurement module. A coherence time window associated with the first quantum memory structure may be greater than a coherence time window time associated with the first quantum system.

In some embodiments, the quantum device may further include a first data processing unit (DPU) operably coupled with the first quantum measurement module and the first quantum memory structure. The first DPU may be configured to generate a first data packet including first quantum data based upon at least one of the one or more measurements by the first quantum measurement module or the obtained first information associated with the first quantum system.

In some further embodiments, the first data packet may be generated local to the quantum device by the first DPU.

In some further embodiments, the quantum device may be operably coupled with a central control unit via a classical communication channel. In such an embodiment, the first DPU may be configured to transmit the generated first data packet to the central control unit.

In some embodiments, the first quantum measurement module may be further operably coupled with a second quantum system. In such an embodiment, the first quantum measurement module may be configured to apply one or more measurements to the second quantum system and obtain second information associated with the second quantum system based on the one or more measurements In some further embodiments, the coherence time window associated with the first quantum memory may be is greater than a coherence time window associated with the second quantum system.

In some embodiments, the quantum device may further include a first data processing unit (DPU) operably coupled with the first quantum measurement module and the first quantum memory structure. In such an embodiment, the first DPU may be configured to generate a first data packet including first quantum data based upon at least one of the one or more measurements by the first quantum measurement module on the first quantum system and the second quantum system or the obtained first information associated with the first quantum system and the obtained second information associated with the second quantum system.

In other embodiments, the quantum device may further include a first data processing unit (DPU) operably coupled with the first quantum measurement module and the first quantum memory structure. In such an embodiment, the first DPU may be configured to generate a first data packet including first quantum data based upon at least one of the one or more measurements by the first quantum measurement module on the first quantum system or the obtained first information associated with the first quantum system. The first DPU may also be configured to generate a second data packet including second quantum data based upon at least one of the one or more measurements by the first quantum measurement module on the second quantum system or the obtained second information associated with the second quantum system.

In some embodiments, the quantum device may further include a second quantum memory structure operably coupled with the first quantum measurement module. In such an embodiment, a coherence time window associated with the second quantum memory structure may be greater than the coherence time window time associated with the second quantum system.

In some embodiments, the quantum device may further include a second quantum measurement module operably coupled with the first quantum system. The second quantum measurement module may be configured to apply one or more measurements to the first quantum system and obtain second information associated with the first quantum system based on the one or more measurements.

In some further embodiments, the one or more measurements applied to the first quantum system by the first quantum measurement module may be of a first type, and the one or more measurements applied to the first quantum system by the second quantum measurement module may be of a second type substantially the same as the first type.

In other further embodiments, the one or more measurements applied to the first quantum system by the first quantum measurement module may be of a first type, and the one or more measurements applied to the first quantum system by the second quantum measurement module may be of a second type different from the first type.

In some embodiments, the quantum device may further include a first data processing unit (DPU) operably coupled with the first quantum measurement module, the second quantum measurement module, and the first quantum memory structure. In such an embodiment, the first DPU may be configured to generate a first data packet including first quantum data based upon at least one of the one or more measurements by the first quantum measurement module and the second quantum measurement module on the first quantum system or the obtained first information and the obtained second information associated with the first quantum system.

In some embodiments, the quantum device may include a first data processing unit (DPU) operably coupled with the first quantum measurement module, the second quantum measurement module, and the first quantum memory structure. In such an embodiment, the first DPU may be configured to generate a first data packet including first quantum data based upon at least one of the one or more measurements by the first quantum measurement module on the first quantum system or the obtained first information associated with the first quantum system. In such an embodiment, the first DPU may be further configured to generate a second data packet including second quantum data based upon at least one of the one or more measurements by the second quantum measurement module on the first quantum system or the obtained second information associated with the first quantum system.

In some embodiments, the quantum device may further include a second quantum memory structure operably coupled with the second quantum measurement module. In such an embodiment. a coherence time window associated with the second quantum memory structure may be greater than the coherence time window time associated with the first quantum system In any embodiment, the first quantum memory structure may include a vertical transistor device having a nanometric channel and/or a memory device formed of one or more transistors including a polaronic switching material.

In any embodiment, a method (e.g., a new methodology) for quantum metrology that employs the quantum devices and associated quantum memory structures described herein may be provided.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
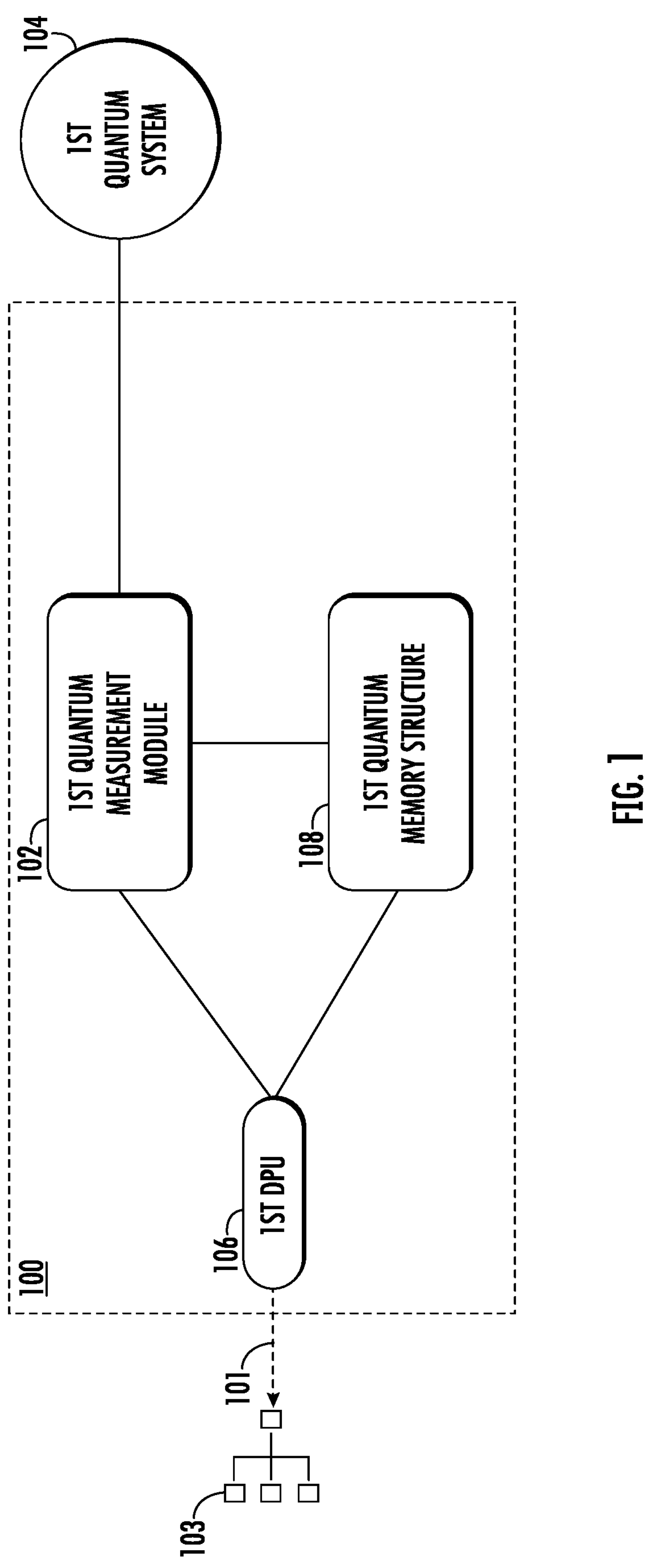
FIG. 1 illustrates an example quantum device operably coupled with a first quantum system in accordance with one or more embodiments of the present disclosure.

Quantum computers represent an emerging type of computer that leverage the laws of quantum mechanics, such as superposition and entanglement, to solve certain computing problems exponentially faster than classical computers (e.g., transistor-based computers). In a quantum computer, the basic units of information are quantum bits (qubits), which are the quantum analog of binary bits in a classical computer. In general, the processing power of a quantum computer may be increased by increasing the number of qubits on the quantum computer. Quantum communication systems also leverage these laws of quantum mechanics (e.g., superposition, entanglement, etc.) to facilitate the transmission of information between two (2) communicating parties and/or separate quantum processors, modules, etc.

As described above, in quantum information theory, a qubit is the basic unit of quantum information and may be formed as a superposition of zero (0) and one (1), unlike classical bits that may only exist as either zero (0) or one (1). Qubits, however, are often fragile and may be impacted by loss or any interaction with the environment. In particular, a qubit may have an associated coherence time that determines how long the quantum state survives before losing information. The length of the coherence time may be determined by the type of the qubit (e.g., photonic qubits, superconducting qubits, trapped ions, etc.), and/or the qubit's interaction with the environment. Furthermore, loss may reduce the coherence time of a qubit and, therefore, limits the available time for an operation to be performed on the qubit. Although any two-state system may be viewed as a qubit, there are other quantum systems for which the possible outcome of a measurement may not be summarized in only two possible states, and these systems are similarly impacted by coherence time.

Quantum devices are also becoming increasingly incompatible with traditional complementary metal-oxide semiconductor (CMOS) processing and the memory devices associated upon this CMOS processing. In particular, traditional memory devices (e.g., silicon-based memory devices) have a coherence time window that is less than the coherence time window associated with quantum systems that are studied by quantum devices. As such, these traditional memory devices are often incompatible with emerging quantum metrology operations in quantum devices due to the inability of these memory devices to store quantum-related data prior to decoherence of the quantum particles associated with these quantum systems. Furthermore, these traditional techniques required large measurement sets and associated statistics as opposed to a straightforward analysis that may be performed in substantially real-time at the quantum device level as described herein.

Thus, to address these and/or other issues, the embodiments of the present disclosure leverage the data transfer and processing speed provided by DPUs and novel quantum memory structures to enable new methodologies for quantum metrology at the quantum device level. The high processing capabilities of the DPU enable these devices and systems to add useful information to the data obtained through the quantum measurements. Furthermore, the quantum memory structures described herein allow sufficient time for the DPUs to perform associated operations (e.g., quantum metrology operations or otherwise) during a coherence time window associated with the quantum system under study. In some embodiments, each quantum device may be associated with a respective quantum system, DPU, and quantum memory structure. In other embodiments, multiple quantum devices, each employing respective quantum memory structures and DPUs may measure the same quantum system. In doing so, the embodiments of the present disclosure may provide new methodologies, leveraging DPU and quantum memory structures, for quantum device metrology which were historically unavailable.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms "substantially" and "approximately" indicate that the referenced element or associated description is accurate to within applicable engineering tolerances.

Example Quantum Devices and Quantum Memory Structures

With reference to FIG. 1, an example quantum device 100 (e.g., first quantum device 100) is illustrated. As shown, the first quantum device 100 may include a first quantum measurement module 102 that is operably coupled with a first quantum system 104. The first quantum system 104 may refer to any system, device, collection of devices, etc. that at least partially employs quantum physics, quantum particles, etc. in its operation. By way of a non-limiting example, the first quantum system 104 may include a quantum communication system, quantum channel, or the like in which photons are the object in the quantum communication system within which data is encoded. Although described in this example embodiment with reference to qubits transmitted via a quantum communication channel, the present disclosure contemplates that the techniques described herein may be applicable to quantum particles of any type or information encoded in any way for transmission via quantum communication channels.

In quantum systems, such as the first quantum system 104, the quantum basis may refer to the way in which data is encoded in an example photon where the data is the value of the encoded information. This encoding may be accomplished via sets of orthogonal quantum states, including, but not limited to, pairs of photonic polarization states. The pairs of photonic polarization states may include, for example, the rectilinear, diagonal, and circular photonic polarization states. The rectilinear basis may refer to the pair of rectilinear photonic polarization states including the horizontal photon polarization state $|0\rangle$ and the vertical photon polarization state $|1\rangle$. The diagonal basis may refer to the pair of diagonal and anti-diagonal photonic polarization states at 45 135 degrees, respectively. The circular basis may refer to the pair of circular photonic polarization states include the left circular photon polarization state $|L\rangle$ and the right circular photon polarization state $|R\rangle$. The state may refer to a basic unit of quantum information comprising a two-level quantum mechanical system, such as the polarization of a single photon (e.g., a photon encoded using a quantum basis as described above). In such an example embodiment, the quantum communication system (e.g., first quantum system 104) may use the quantum state, quantum basis, etc., among other attributes of the quantum particles, to transmit data.

By way of an additional example, the first quantum system 104 may refer to a quantum computer or quantum computing system. In such an example embodiment, the quantum computing system (e.g., first quantum system 104) may rely upon the quantum state, quantum basis, etc., among other attributes of the quantum particles, to perform one or more operations, processes, computations, and/or the like. As would be evident to one of ordinary skill in the art in light of the present disclosure, the example quantum computer or quantum computing system (e.g., first quantum system 104) may be configured to perform any computational problem associated with classical computers. Said differently, quantum algorithms employed by the example quantum computer (e.g., first quantum system 104) for certain computational problems may have significantly lower time requirements than corresponding classical algorithms. Although described herein with reference to an example quantum communication systems and quantum computing systems, the present disclosure contemplates that the first quantum system 104 may refer to any system, device, collection of devices, etc. that at least partially rely upon quantum mechanical phenomena, quantum physics, quantum particles, etc. in its operation.

With continued reference to FIG. 1, the first quantum system 104 may be operably coupled with the first quantum measurement module 102. By way of example, in instances in which the first quantum system 104 is a quantum communication system, the first quantum measurement module 102 may be operably or communicably coupled with a quantum communication channel configured to transmit information encoded in one or more qubits. Additionally or alternatively, the first quantum measurement module 102 may be directly coupled with the first quantum system 104, such as in instances in which the first quantum system 104 is a quantum computer. The present disclosure contemplates that the first quantum measurement module 102 may be coupled with the first quantum system 104 (e.g., the quantum system under study) by any mechanism, structure, etc. so as to apply measurements to the first quantum system 104 as described hereafter.

The first quantum measurement module 102 may be configured to apply one or more measurements to the first quantum system 104 and may include any components used for applying such a measurement. The measurement may refer to a manipulation of qubits used by the first quantum system 104 to yield information regarding the state of each qubit. An example measurement as described herein may be configured to ascertain or determine any parameter, attribute, etc. of the first quantum system 104 and may further be configured to determine, infer, or detect any information, content, and/or data transmitted or used by the first quantum system 104. The measurements of the first quantum measurement modules 102 may be associated with a strength or magnitude that may refer to the physical coupling (e.g., mutual interaction) between the first quantum measurement module 102 and the first quantum system 104. The strength or magnitude may be used with reference to example measurements as described above and may further be variable (e.g., variable strength measurements). As would be evident to one of ordinary skill in the art in light of the present disclosure, the measurement by the first quantum measurement module 102 may at least partially disturb the quantum particles of the first quantum system 104, and the strength of the measurement may be directly related to this disturbance. Said differently, as the strength of the applied measurement increases, the information obtained by the first quantum measurement module 102 may increase, but the disturbance to the first quantum system 104 may similarly increase.

In some examples described herein, the strength of the measurement may be referred to as weak (e.g., a weak measurement) in that the strength of the measurement is such that the first quantum measurement module 102 obtains less information (e.g., relative a strong measurement) about the underlying data but also disturbs the first quantum system 104 less (e.g., relative a strong measurement). Furthermore, the term weak measurement may also encompass any variable-strength measurement that does not necessarily lead to a wave function collapse as described herein. In other words, the measurements referred to hereinafter as weak measurements do not require a particular or defined strength or magnitude, but instead refer to any measurement or collection of measurements that do not necessarily result in collapse of the wave function of the measure signal and/or qubit. The present disclosure contemplates that the first quantum measurement module 102 may employ measurements of any strength, frequency, type, etc. based upon the quantum system under study (e.g., the first quantum system 104) and/or the intended application of the quantum device 100.

The first quantum measurement module 102 may further be configured to obtain information associated with the first quantum system 104 based on the one or more measurements. As described above, the quantum basis may refer to the way in which data is encoded in an example photon where the data is the value of the encoded information. As such, in some embodiments, the information obtained by the first quantum measurement module 102 associated with the first quantum system 104 may be indicative of the quantum basis of at least one of the quantum particles (e.g., photons or the like) leveraged by the first quantum system 104. By way of an additional example, the information obtained by the first quantum measurement module 102 associated with the first quantum system 104 may be indicative of the polarization state of at least one of the quantum particles (e.g., photons or the like) leveraged by the first quantum system 104. Although described herein with reference quantum basis and polarization state as example information that may be obtained by the first quantum measurement module 102, the present disclosure contemplates that any parameter, attribute, characteristic, etc. associated with the first quantum system 104 may be obtained by the first quantum measurement module 102. Furthermore, in some embodiments, the obtained information may include or otherwise be indicative of the underlying data encoded by the quantum particles used by the first quantum system 104.

As described above, a qubit may have an associated coherence time that determines how long the quantum state survives before losing information. By way of example, the first quantum system 104 may have an associated coherence time window during which the quantum state of the first quantum system 104 may survive before losing information. Said differently, information associated with the first quantum system 104 that is obtained outside of the coherence time window associated with the first quantum system 104 may be incomplete, inaccurate, and/or the like due potential loss associated with the first quantum system 104 outside of the coherence time window. In order to enable a new methodology for quantum metrology, the first quantum device 100 may further include a first quantum memory structure 108. The first quantum memory 108 structure may be operably coupled with the first quantum measurement module 102 and the first DPU 106. A coherence time window associated with the first quantum memory structure 108 may be greater than a coherence time window time associated with the first quantum system 104. Said differently, the first quantum memory structure 108 may have a coherence time window that is greater than the coherence time window during which the first quantum measurement device 102 performs its operations associated with the first quantum system 104. In doing so, the first quantum memory structure 108 may be configured to store data indicative of or otherwise associated with the one or more measurements by the first quantum measurement module 102 on the first quantum system 104 and/or the obtained information associated with the first quantum system 104.

The first quantum memory structure 108 may further be readable by quantum metrology tools (e.g., scanned or the like) so as to serve as a fundamental building block for emerging quantum artificial intelligence (AI) systems. The solution provided by the first quantum memory structure 108 and associated first quantum device 100 may also serve as a fundamental building block in Gate-All-Around (GAA) fabrications. By way of a non-limiting example, the first quantum memory structure 108 may include a vertical transistor device having a nanometric channel, such as those described in U.S. patent application Ser. No. 12/811,710, filed Jul. 6, 2010, the entire contents of which application are herein incorporated by reference. By way of an additional, non-limiting example, the first quantum memory structure 108 may include a memory device formed of one or more transistors comprising a polaronic switching material, such as those described in U.S. patent application Ser. No. 17/394,515, filed Aug. 5, 2021, the entire contents of which application are herein incorporated by reference. The present disclosure contemplates that the first quantum memory structure 108 may employ any molecular memory, polaronic switching, vertical memory structure, and/or the like based upon the intended application of the first quantum device 100 and/or the nature of the first quantum system 104. Furthermore, the present disclosure contemplates that the architectures described herein may be applicable with implementations in which the N-channel and the P-channel transistors are stacked on top of one another (e.g., a complimentary field-effect transistor (cFET) device).

Example DPU Implementations

The quantum device 100 may further include a first data processing unit (DPU) 106 operably coupled with the first quantum measurement module 102 and the first quantum memory structure 108. The high processing capabilities of the first DPU 106 enables the quantum device 100 to add useful information to the data obtained by the first quantum measurement module 102, and the first quantum measurement structure 108 provides storage of this data during a coherence time window associated with the first quantum system 104 as described above. The first DPU 106 may be configured to generate a data packet comprising quantum data based upon at least one of the one or more measurements by the first quantum measurement module 102 or the obtained information associated with the first quantum system 104. As described herein, this data packet may include data entries associated with any metrology related operations and/or the results thereof. As described above, the first quantum memory structure 108 may include a coherence time window that is greater than a coherence time window time associated with the first quantum system 104 so as to store the data described herein.

Figure 2:
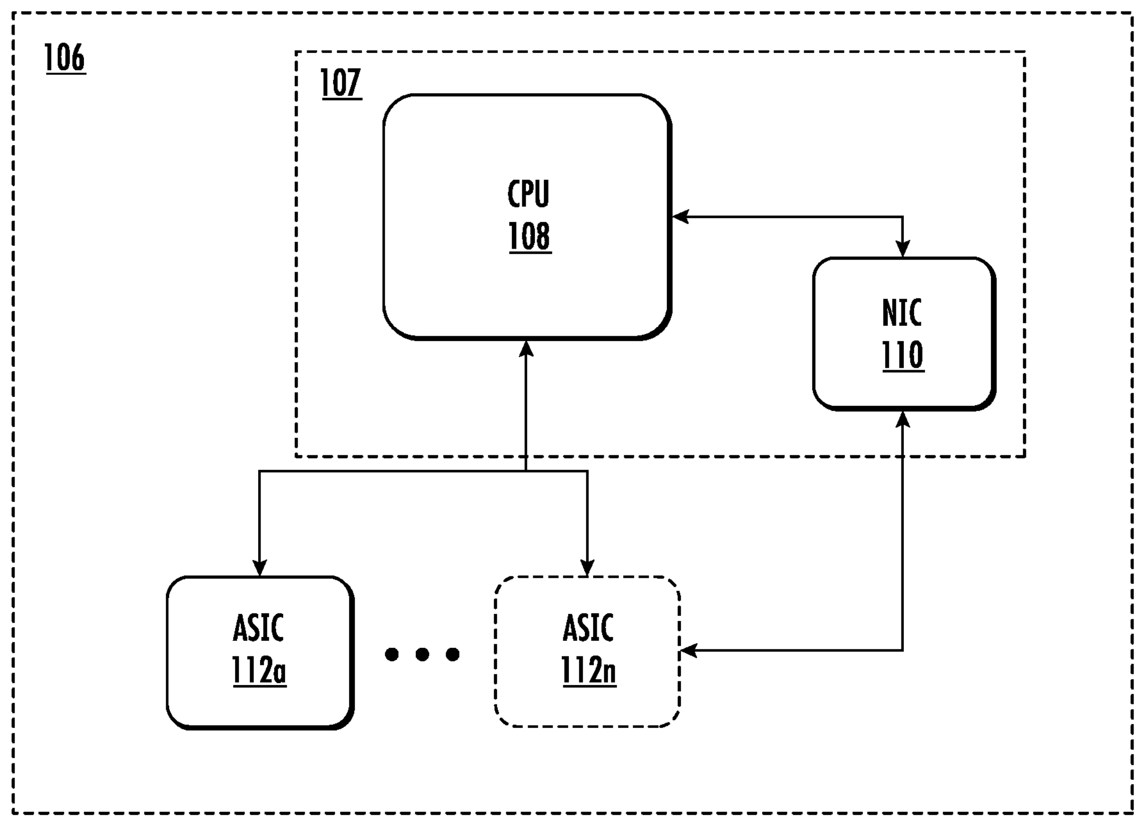
FIG. 2 illustrates an example DPU for use by the quantum devices described herein in accordance with one or more embodiments of the present disclosure.

As shown in FIG. 2, the first DPU 106 may include one or more application-specific integrated circuits (ASICs) 112*a-n* (e.g., acceleration engines) that are communicably coupled with the processing portion 107 of the first DPU 106. As shown, the processing portion 107 of the first DPU 106 may include a high-performance, software-programmable central processing unit (CPU) 108 that is communicably coupled with a network interface controller (NIC) 110. As described hereinafter with reference to the circuitry components of FIG. 3, the CPU 108 and the NIC 110 may be configured to generate a data packet comprising quantum data. Unlike conventional systems in which a centralized control unit or processor may directly receive data from a measurement module, the first DPU 106 of the present disclosure may operate to perform preprocessing steps (e.g., timestamping or the like) prior to transmission to a centralized control device and associated network. Said differently, the data packet that includes quantum data may be generated local to the quantum device 100 by the first DPU 106 as part of a preprocessing operation and/or as part of the new methodology for quantum device metrology enabled by the devices described herein.

Figure 3:
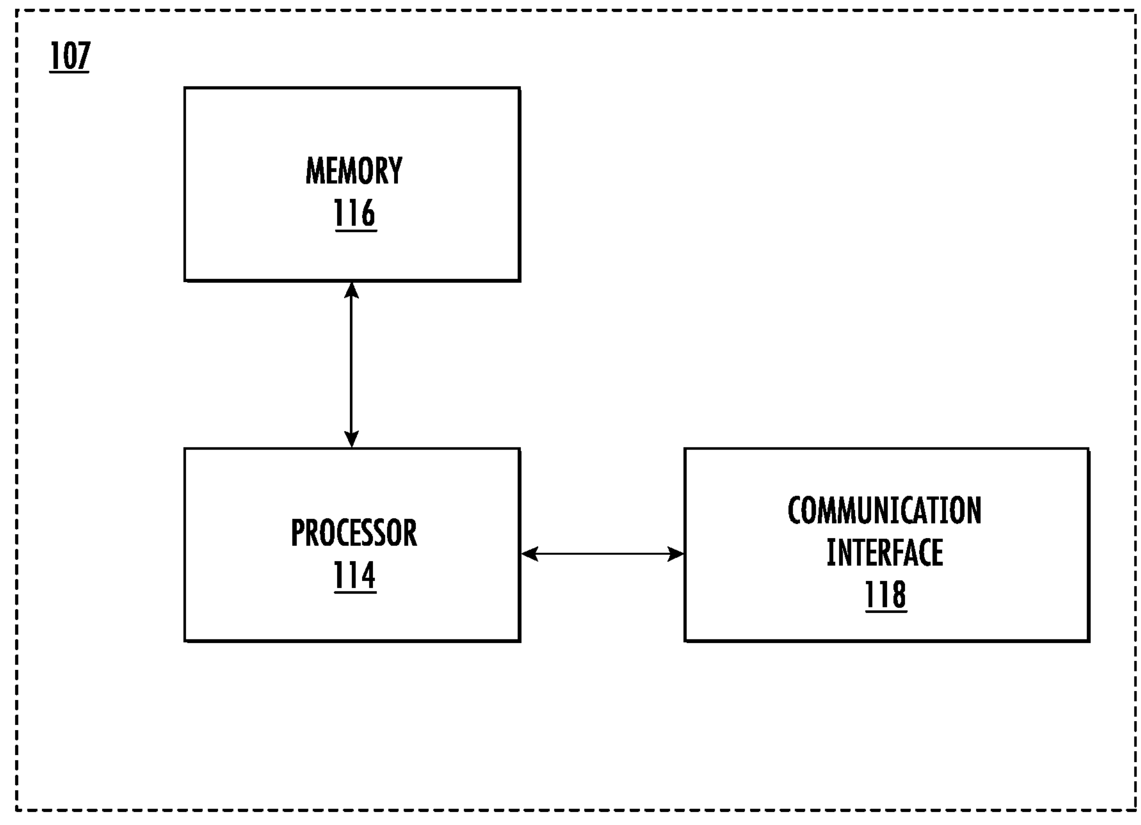
FIG. 3 illustrates example circuitry components for use by the example DPU of FIG. 2 in accordance with one or more embodiments of the present disclosure.

With reference to FIG. 3, example circuitry components of the processing portion of the first DPU 106 (e.g., the CPU 108 and/or the NIC 110) are illustrated that may, alone or in combination with any of the components described herein, be configured to perform the operations. As shown, the first DPU 106 may include, be associated with or be in communication with processor 114, a memory 116, and a communication interface 118. The processor 114 may be in communication with the memory 116 via a bus for passing information among components of the first DPU 106. The memory 116 may be non-transitory and may include, for example, one or more volatile and/or non-volatile memories. In other words, for example, the memory 116 may be an electronic storage device (e.g., a computer readable storage medium) comprising gates configured to store data (e.g., bits) that may be retrievable by a machine (e.g., a computing device like the processing circuitry). The memory 116 may be configured to store information, data, content, applications, instructions, or the like for enabling the apparatus to carry out various functions in accordance with an example embodiment of the present disclosure. For example, the memory 116 could be configured to buffer input data for processing by the processor 114. Additionally or alternatively, the memory 116 could be configured to store instructions for execution by the processor 114. In some embodiments, the memory 116 may, in whole or in part, comprise the first quantum memory structure 108. In other embodiments, the memory 116 may be distinct from the first quantum memory structure 108.

The first DPU 106 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 114 may be embodied in a number of different ways. For example, the processor 114 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 114 may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processor 114 may be configured to execute instructions stored in the memory 116 or otherwise accessible to the processor 114. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processor 114 is embodied as an executor of instructions, the instructions may specifically configure the processor to perform the algorithms and/or operations described herein when the instructions are executed. However, in some cases, the processor 114 may be a processor of a specific device configured to employ an embodiment of the present disclosure by further configuration of the processing circuitry by instructions for performing the algorithms and/or operations described herein. The processor 114 may include, among other things, a clock, an arithmetic logic unit (ALU) and logic gates configured to support operation of the processing circuitry.

The communication interface 118 may be any means such as a device or circuitry embodied in either hardware or a combination of hardware and software that is configured to receive and/or transmit data, including media content in the form of video or image files, one or more audio tracks or the like. In this regard, the communication interface 118 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms. By way of a non-limiting example, the communication interface 118 may include a host interface (e.g., PCIe or the like) and a network interface (e.g., Ethernet, InfiniBand®, or the like).

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the first DPU 106 may provide or supplement the functionality of particular circuitry.

Turning back to FIG. 1, the first quantum device 100 may be operably coupled with a first central control unit 103 via a first classical communication channel 101. The first central control unit 103 may be any classical device configured to process, analyze, etc. the data provided from the first quantum device 100. As such, the first central control unit 103 may refer to any collection of computing devices (e.g., CPUs, DPUs, graphics processing units (GPUs), etc.) configured to alone or collectively perform operations of data generated by quantum devices. In operation, the first DPU 106 may be configured to transmit the generated data packet 400 to the central control unit 103 via the first classical communication channel 101. As would be evident to one of ordinary skill in the art in light of the present disclosure, the first classical communication channel 101 may refer to any medium through or by which data may be transmitted (e.g., optical fibers, free space, electrical wires, etc.). The first central control unit 103 may further refer to a network associated with the quantum devices, systems, etc. described herein. By way of example, the first DPU 106 of the first quantum device 100 may generate a data packet that is provided not only to the first central control unit 103 but also to any other device, collection of devices, etc. formed as part of a larger network that includes the first central control unit 103 and the first quantum device 100.

Multi-Measurement and Memory Implementations

Figure 4:
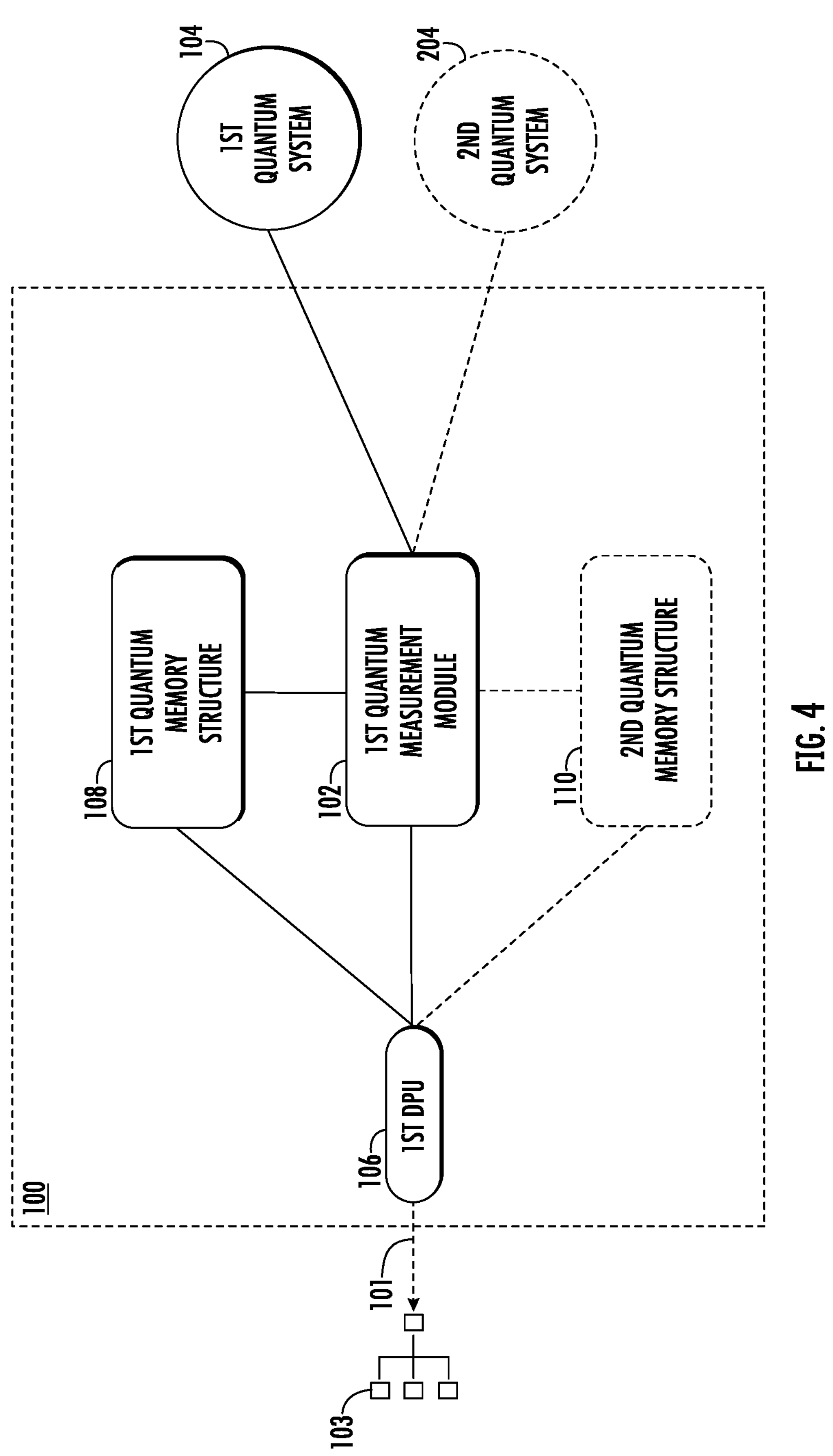
FIG. 4 illustrates an example quantum device operably coupled with a first and a second quantum system in accordance with one or more embodiments of the present disclosure.

With reference to FIG. 4, in some embodiments, the first quantum measurement module 102 of the first quantum device 100 may further be operably coupled with a second quantum system 204. In such an embodiment, the first quantum measurement module 102 may be configured to apply one or more measurements to the second quantum system 204 and obtain second information associated with the second quantum system 204 based on the one or more measurements. Applying the one or more measurements and obtaining the second information of the second quantum system 204 may occur substantially the same as described above with reference to FIG. 1. The present disclosure further contemplates that the second quantum system 204 may refer to any system, device, collection of devices, etc. that at least partially employs quantum physics, quantum particles, etc. in its operation similar to the first quantum system 104 described above.

In some embodiments, the first quantum memory structure 108 may also be configured to store data indicative of or otherwise associated with the one or more measurements by the first quantum measurement module 102 on the second quantum system 204 and/or the obtained information associated with the second quantum system 204. As such, a coherence time window associated with the first quantum memory structure 108 may be greater than a coherence time window time associated with the second quantum system 204. Said differently, the first quantum memory structure 108 may have a coherence time window that is greater than the coherence time window during which the first quantum measurement device 102 performs its operations associated with the second quantum system 204.

Additionally or alternatively, in some embodiments, the first quantum device 100 of FIG. 4 may include a second quantum memory structure 110 operably coupled with the first quantum measurement module 102 that may be similar to the first quantum memory structure 108 described above. In such an embodiment, the second quantum memory structure 110 may be configured to store data indicative of or otherwise associated with the one or more measurements by the first quantum measurement module 102 on the second quantum system 204 and/or the obtained information associated with the second quantum system 204. As such, a coherence time window associated with the second quantum memory structure 110 may be greater than a coherence time window time associated with the second quantum system 204. Said differently, the second quantum memory structure 110 may have a coherence time window that is greater than the coherence time window during which the first quantum measurement device 102 performs its operations associated with the second quantum system 204. In such an embodiment, the first quantum device 100 may leverage any number of quantum memory structures 108, 110 that are quantum system specific 104, 204. Furthermore, in some embodiments, the first quantum device 100 may include additional quantum memory structures, such as the second quantum memory structure 110, regardless of the number of associated quantum systems 104, 204 under study so as to increase the memory capacity of the first quantum device 100.

Figure 5:
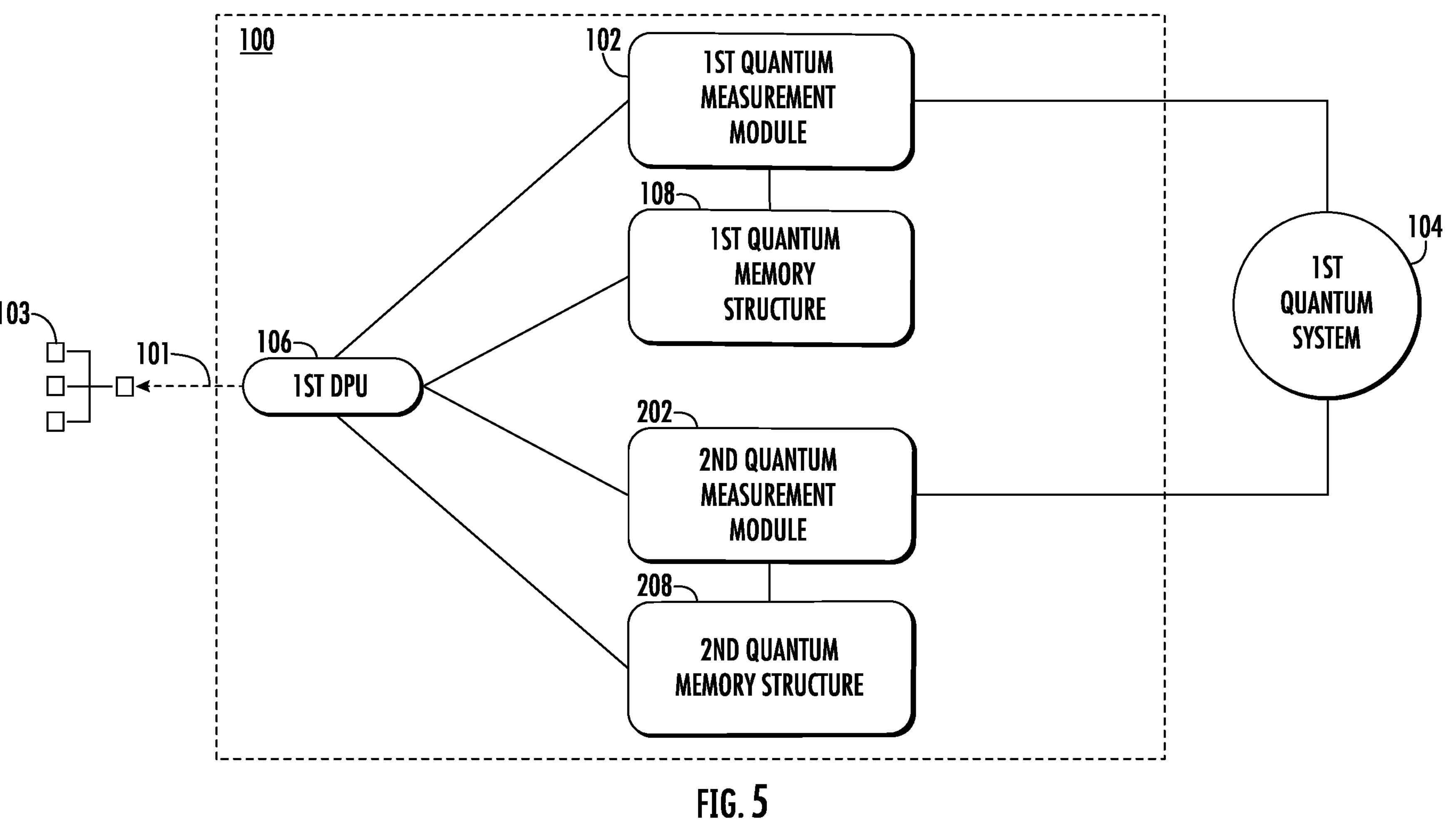
FIG. 5 illustrates an example quantum device employing multiple quantum measurement modules associated with the same quantum system under study in accordance with one or more embodiments of the present disclosure.

With reference to FIG. 5, in some embodiments, multiple quantum measurement modules and associated memory structures may be associated with the same quantum system. As shown, for example, the first quantum device 100 of FIG. 5 may include a first quantum measurement module 102 and associated first quantum memory structure 108 associated with a first quantum system 104 as described above. The first quantum device 100, however, may also include a second quantum measurement module 202 operably coupled with the first quantum system 104. The second quantum measurement module 202 may be configured to apply one or more measurements to the first quantum system 104 and obtain second information associated with the first quantum system 104 based on the one or more measurements.

In some embodiments, the second quantum measurement module 202 may perform the same or substantially measurements (e.g., type, magnitude, frequency, etc.) as the described first quantum measurement module 102. In other embodiments, the second quantum measurement module 202 may perform different measurements (e.g., type, magnitude, frequency, etc.) as the described first quantum measurement module 102. Said differently, in some embodiments, the one or more measurements applied to the first quantum system 104 by the first quantum measurement module 102 may be of a first type, and the one or more measurements applied to the first quantum system 104 by the second quantum measurement module 202 may be of a second type substantially the same as the first type. In other embodiments, the one or more measurements applied to the first quantum system 104 by the first quantum measurement module 102 may be of a first type, and the one or more measurements applied to the first quantum system 104 by the second quantum measurement module 202 may be of a second type different from the first type. The present disclosure contemplates that the measurements applied and/or information obtained by the first quantum measurement module 102 and the second quantum measurement module

202 may vary based upon the intended application of the first quantum device 100 and/or the nature of the first quantum system 104 under study.

With continued reference to FIG. 5, the first quantum measurement module 102 may be associated with a first quantum memory structure 108. In such an embodiment, the first quantum memory structure 108 may be configured to store data indicative of or otherwise associated with the one or more measurements by the first quantum measurement module 102 on the first quantum system 104 and/or the obtained information associated with the first quantum system 104. As such, a coherence time window associated with the first quantum memory structure 108 may be greater than a coherence time window time associated with the first quantum system 104 as described above. Similarly, the second quantum measurement module 202 may be associated with a second quantum memory structure 208. In such an embodiment, the second quantum memory structure 208 may be configured to store data indicative of or otherwise associated with the one or more measurements by the second quantum measurement module 202 on the first quantum system 104 and/or the obtained information associated with the first quantum system 104. As such, a coherence time window associated with the second quantum memory structure 208 may also be greater than a coherence time window time associated with the first quantum system 104 as described above.

In the embodiments, of FIGS. 4-5, the second quantum measurement module 202 and second quantum memory structure 110, 208 may be operably coupled with the first DPU 106. With reference to FIG. 4, the first data packet comprising first quantum data based upon at least one of the one or more measurements by the first quantum measurement module 102 on the first quantum system 104 and the second quantum system 204 or the obtained first information associated with the first quantum system 104 and the obtained second information associated with the second quantum system 204. In other embodiments, the first DPU 106 may be configured to generate a first data packet comprising first quantum data based upon at least one of the one or more measurements by the first quantum measurement module 102 on the first quantum system 104 or the obtained first information associated with the first quantum system 104. In such an embodiment, the first DPU 106 may be configured to generate a second data packet comprising second quantum data based upon at least one of the one or more measurements by the first quantum measurement module 102 on the second quantum system 204 or the obtained second information associated with the second quantum system 204.

With reference to FIG. 5, the first DPU 106 may be configured to generate a first data packet comprising first quantum data based upon at least one of the one or more measurements by the first quantum measurement module 102 and the second quantum measurement module 202 on the first quantum system 104 or the obtained first information and the obtained second information associated with the first quantum system 104. In other embodiments, the first DPU 106 may be configured to generate a first data packet comprising first quantum data based upon at least one of the one or more measurements by the first quantum measurement module 102 on the first quantum system 104 or the obtained first information associated with the first quantum system 104. In such an embodiment, the first DPU 106 may be further configured to generate a second data packet comprising second quantum data based upon at least one of the one or more measurements by the second quantum measurement module 202 on the first quantum system 104 or the obtained second information associated with the first quantum system 104. The present disclosure contemplates that the first DPU 106 (and any number of DPUs of the quantum devices) may generate data packets associated with any data based upon the intended application of the quantum device 100.

Figure 6:
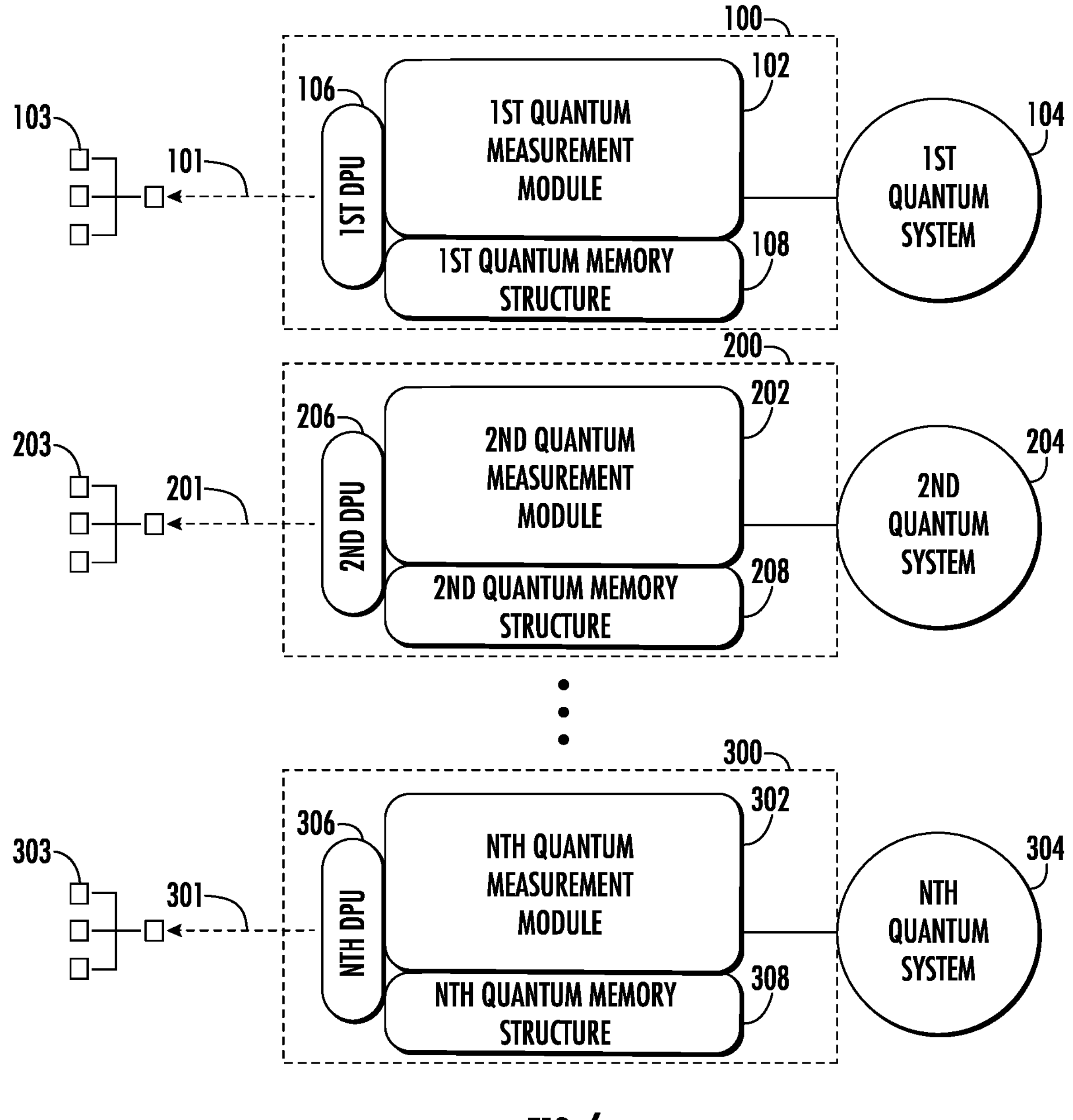
FIG. 6 illustrates an example quantum system arrangement with multiple quantum systems under study in accordance with one or more embodiments of the present disclosure.

With reference to FIG. 6, an example quantum system arrangement 500 is illustrated. As shown, the quantum system arrangement 500 may include a plurality of quantum systems, where each of which are coupled to respective quantum devices. In particular, the first quantum device 100 having a first quantum measurement module 102, a first DPU 106, and a first quantum memory structure 108 and may be coupled with a first quantum system 104 and a first central control unit 103. A second quantum device 200 having a second quantum measurement module 202, a second DPU 206, and a second quantum memory structure 208 may be coupled with a second quantum system 204 and a second central control unit 203 (e.g., via classical channel 201). An $N^{th}$ quantum device 300 having an $N^{th}$ quantum measurement module 302, an $N^{th}$ DPU 306, and an $N^{th}$ quantum memory structure 308 may be coupled with an $N^{th}$ quantum system 304 and an $N^{th}$ central control unit 303 (e.g., via classical channel 301). Each of the quantum devices 100, 200, 300 of the example quantum system arrangement 500 may perform the operations described above with reference to FIGS. 1-5 and may similarly employ the same devices, components, elements, etc. The present disclosure contemplates that the quantum system arrangement 500 may include any number of quantum devices and quantum systems based upon the intended application of the arrangement 500. Furthermore, although illustrated and described as distinct central control units 103, 203, 303, the present disclosure contemplates that these control units may further refer to the network associated with these control units. For example and as described above with reference to the first central control unit 103, the quantum devices 100, 200, 300 may be formed as part of a network of quantum devices that includes various computing devices (e.g., central control units 103, 203, 303, etc.) such that the data packets generated by these quantum devices 100, 200, 300 may be provided to the larger network.

Many modifications and other embodiments of the present disclosure will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A quantum device comprising:

a first quantum measurement module operably coupled with a first quantum system, wherein the first quantum measurement module is configured to:

apply one or more measurements to the first quantum system; and obtain first information associated with the first quantum system based on the one or more measurements; and a first quantum memory structure operably coupled with the first quantum measurement module, wherein a coherence time window for the first quantum memory structure is greater than a coherence time window time for the first quantum system, wherein the first quantum memory structure comprises a vertical transistor device having a nanometric channel and/or a memory device formed of one or more transistors comprising a polaronic switching material.

2. The quantum device according to claim 1, further comprising a first data processing unit (DPU) operably coupled with the first quantum measurement module and the first quantum memory structure, wherein the first DPU is configured to generate a first data packet comprising first quantum data based upon at least one of:

the one or more measurements by the first quantum measurement module, or the obtained first information associated with the first quantum system.

3. The quantum system according to claim 2, wherein the first data packet is generated local to the quantum device by the first DPU.

4. The quantum device according to claim 2, wherein the quantum device is operably coupled with a central control unit via a classical communication channel.

5. The quantum device according to claim 4, wherein the first DPU is configured to transmit the generated first data packet to the central control unit.

6. The quantum device according to claim 1, wherein the first quantum measurement module is further operably coupled with a second quantum system, wherein the first quantum measurement module is configured to:

apply one or more measurements to the second quantum system; and obtain second information associated with the second quantum system based on the one or more measurements.

7. The quantum device according to claim 6, wherein the coherence time window for the first quantum memory structure is greater than a coherence time window for the second quantum system.

8. The quantum device according to claim 6, further comprising a first data processing unit (DPU) operably coupled with the first quantum measurement module and the first quantum memory structure, wherein the first DPU is configured to generate a first data packet comprising first quantum data based upon at least one of:

the one or more measurements by the first quantum measurement module on the first quantum system and the second quantum system; or the obtained first information associated with the first quantum system and the obtained second information associated with the second quantum system.

9. The quantum device according to claim 6, further comprising a first data processing unit (DPU) operably coupled with the first quantum measurement module and the first quantum memory structure, wherein the first DPU is configured to:

generate a first data packet comprising first quantum data based upon at least one of:

the one or more measurements by the first quantum measurement module on the first quantum system; or the obtained first information associated with the first quantum system; and generate a second data packet comprising second quantum data based upon at least one of:

the one or more measurements by the first quantum measurement module on the second quantum system; or the obtained second information associated with the second quantum system.

10. The quantum device according to claim 7, further comprising a second quantum memory structure operably coupled with the first quantum measurement module, wherein a coherence time window for the second quantum memory structure is greater than the coherence time window for the second quantum system.

11. The quantum device according to claim 1, further comprising:

a second quantum measurement module operably coupled with the first quantum system, wherein the second quantum measurement module is configured to:

apply one or more measurements to the first quantum system; and obtain second information associated with the first quantum system based on the one or more measurements.

12. The quantum device according to claim 11, wherein the one or more measurements applied to the first quantum system by the first quantum measurement module are of a first type, and the one or more measurements applied to the first quantum system by the second quantum measurement module are of a second type substantially the same as the first type.

13. The quantum device according to claim 11, wherein the one or more measurements applied to the first quantum system by the first quantum measurement module are of a first type, and the one or more measurements applied to the first quantum system by the second quantum measurement module are of a second type different from the first type.

14. The quantum device according to claim 11, further comprising a first data processing unit (DPU) operably coupled with the first quantum measurement module, the second quantum measurement module, and the first quantum memory structure, wherein the first DPU is configured to generate a first data packet comprising first quantum data based upon at least one of:

the one or more measurements by the first quantum measurement module and the second quantum measurement module on the first quantum system; or the obtained first information and the obtained second information associated with the first quantum system.

15. The quantum device according to claim 11, further comprising a first data processing unit (DPU) operably coupled with the first quantum measurement module, the second quantum measurement module, and the first quantum memory structure, wherein the first DPU is configured to:

generate a first data packet comprising first quantum data based upon at least one of:

the one or more measurements by the first quantum measurement module on the first quantum system; or the obtained first information associated with the first quantum system; and generate a second data packet comprising second quantum data based upon at least one of:

the one or more measurements by the second quantum measurement module on the first quantum system; or the obtained second information associated with the first quantum system.

16. The quantum device according to claim 11, further comprising a second quantum memory structure operably coupled with the second quantum measurement module, wherein a coherence time window for the second quantum memory structure is greater than the coherence time window for the first quantum system.

17. A method for quantum device metrology performed via the quantum device according to claim 1.

18. A quantum system arrangement comprising:

a first quantum device comprising:

a first quantum measurement module operably coupled with a first quantum system, wherein the first quantum measurement module is configured to:

apply one or more measurements to the first quantum system; and obtain first information associated with the first quantum system based on the one or more measurements; and a first quantum memory structure operably coupled with the first quantum measurement module, wherein a coherence time window associated with the first quantum memory structure is greater than a coherence time window time associated with the first quantum system, wherein the first quantum memory structure comprises a vertical transistor device having a nanometric channel and/or a memory device formed of one or more transistors comprising a polaronic switching material; and a second quantum device comprising:

a second quantum measurement module operably coupled with a second quantum system, wherein the second quantum measurement module is configured to:

apply one or more measurements to the second quantum system; and obtain second information associated with the second quantum system based on the one or more measurements; and a second quantum memory structure operably coupled with the second quantum measurement module, wherein a coherence time window associated with the second quantum memory structure is greater than a coherence time window time associated with the second quantum system.

19. The quantum system arrangement according to claim 18, further comprising a first data processing unit (DPU) operably coupled with the first quantum measurement module and the first quantum memory structure, wherein the first DPU is configured to generate a first data packet comprising first quantum data based upon at least one of:

the one or more measurements by the first quantum measurement module, or the obtained first information associated with the first quantum system.

20. The quantum system arrangement according to claim 19, wherein the first data packet is generated local to the first quantum device by the first DPU.

* * * * *